April 12, 1955     W. E. BURDICK     2,705,926
RAILWAY VEHICLE ANTI-NOSING AND ANTI-SWAY STRUCTURE
Filed June 17, 1949     2 Sheets-Sheet 1
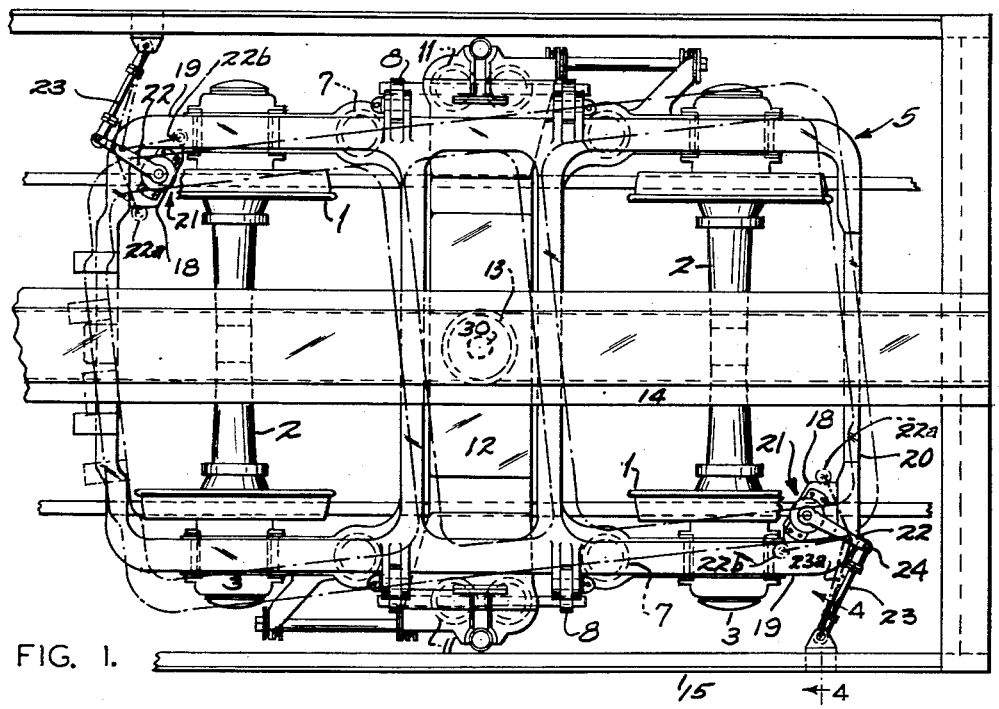
FIG. 1.
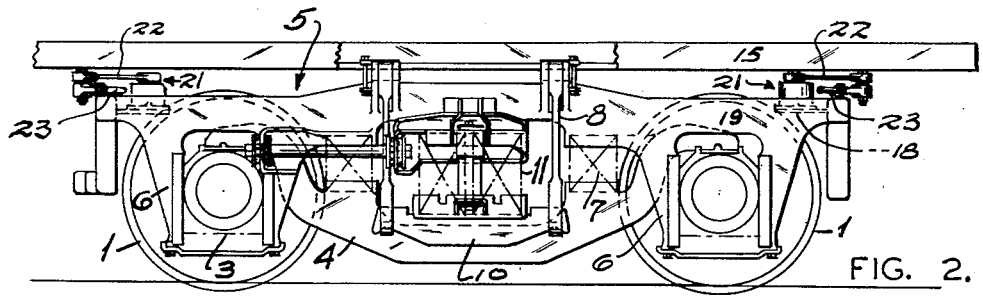
FIG. 2.
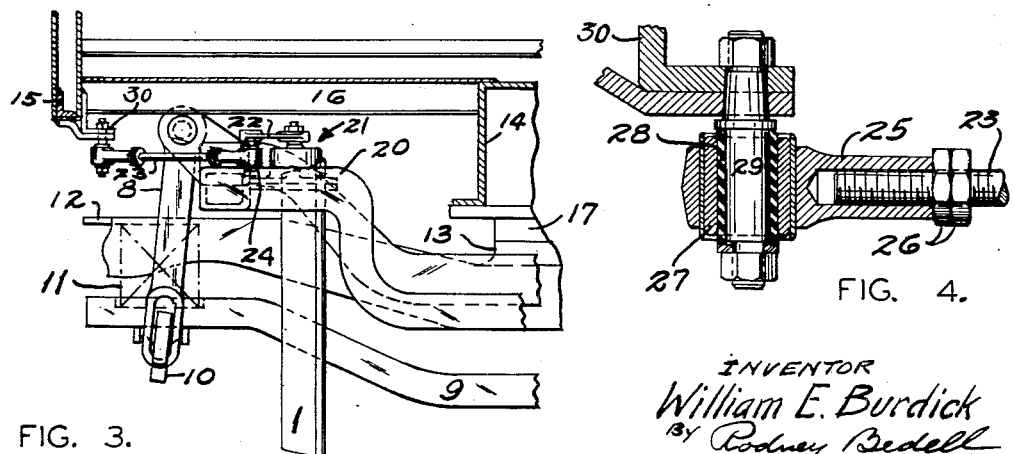
FIG. 3.
FIG. 4.
INVENTOR
William E. Burdick
BY Rodney Bedell
ATTY.

April 12, 1955

W. E. BURDICK 2,705,926

RAILWAY VEHICLE ANTI-NOSING AND ANTI-SWAY STRUCTURE

Filed June 17, 1949

INVENTOR
William E. Burdick
By Rodney Bedell
ATTY.

United States Patent Office 2,705,926
Patented Apr. 12, 1955

2,705,926

RAILWAY VEHICLE ANTI-NOSING AND ANTI-SWAY STRUCTURE

William E. Burdick, St. Louis, Mo., assignor to General Steel Castings Corporation, Granite City, Ill., a corporation of Delaware Application June 17, 1949, Serial No. 99,708

1 Claim. (Cl. 105—199)

The invention relates to railway rolling stock and consists in a connection between a railway truck which has a swivel assembly with the vehicle body, whereby the relative movement of the ends of the truck transversely of the body is yieldingly restrained without substantial resistance being offered to the relative vertical movement of the truck and vehicle body as is necessary to permit the truck springs to function as intended.

The object of the invention is to prevent "nosing" and undesirable side sway of the vehicle. Nosing, as applied to vehicles moving along a railway track, may be defined as a horizontal lateral sinusoidal oscillation with one end of the structure substantially out of phase with the other. Swaying may be defined as a similar oscillation but with both ends substantially in the same phase. The invention is particularly adapted for use in a railway vehicle truck and body assembly wherein the truck bolster, and the vehicle body mounted thereon, may move laterally of the truck frame because the bolster is supported from the truck frame either by swing hangers, rockers, rollers, or other lateral motion devices which permit relative movement of the truck bolster, and the vehicle body carried thereon, transversely of the truck frame and thereby tend to prevent the direct transmission of lateral shocks between the truck and body due to rail conditions.

With such truck structure, the ends of the truck not only may move transversely of the vehicle body, due to their swiveling about the center pin connection to the vehicle body, but the ends of the truck may move transversely of the vehicle body because of the lateral motion devices mounting the truck bolster in the truck frame. These movements may be cumulative. A shock-absorbing connection between one end of the truck frame and the vehicle body will not effectively avoid nosing and undesirable sway since the relative lateral movement of the bolster and truck frame will permit the other end of the truck to pivot about the connection at the first-mentioned end of the truck. Nor would a shock absorber connection between the truck frame and the vehicle body at both ends of the truck, necessarily effectively resist nosing and side sway. Such connections may be provided to resist "galloping" of the truck frame, that is, inclination of the truck frame to the horizontal, longitudinally of the truck, and a connection which is best adapted to yieldingly resist galloping is not well adapted to resist nosing.

More specifically, the present invention consists in providing shock absorber devices between each end of the truck and the vehicle body with each device disposed to offer substantially all of its resistance to forces or moments applied in a substantially horizontal plane while offering substantially no resistance to forces or moments applied in vertical planes.

The present invention and its objectives will be well understood to those skilled in the art upon consideration of the following description, reference being had to the accompanying drawings, in which—

Figure 1 is a top view of a railway truck showing main members of the underframe of a vehicle body mounted on the truck, the truck frame being shown in dot-dash lines in a position in which it has rotated from a normal position about its swivel connection to the body. Different positions of the shock absorber and link connection are shown diagrammatically.

Figure 2 is a side elevation of the structure shown in Figure 1.

Figure 3 is an end elevation of the structure shown in Figures 1 and 2.

Figure 4 is a detailed section taken approximately on the line 4—4 of Figure 1 and drawn to an enlarged scale.

Figure 5:
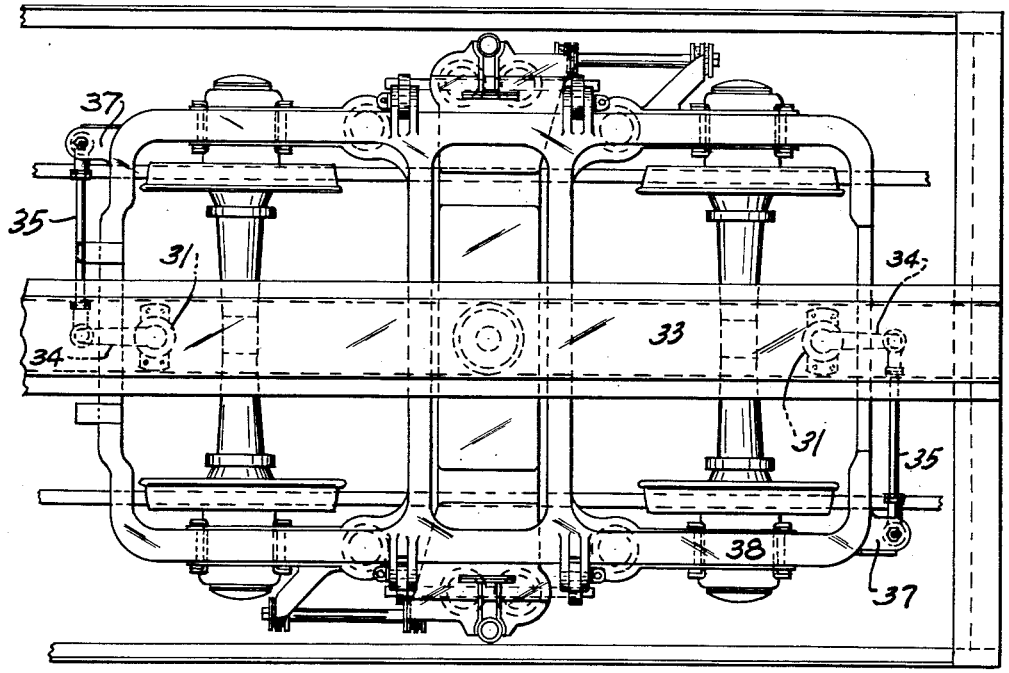
Figure 6:
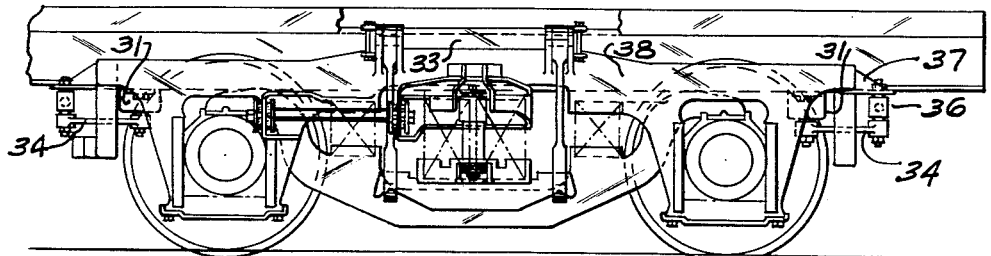
Figure 7:
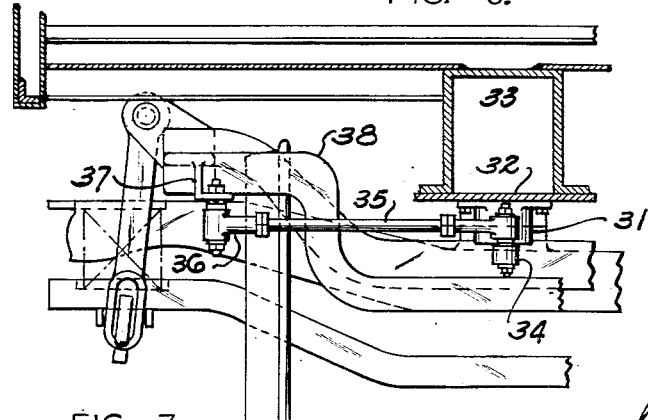

Figures 5, 6, and 7 correspond to Figures 1, 2, and 3, but illustrate another form of the invention.

The truck shown in Figures 1, 2, 3 and 4 of the drawings is of well-known construction and comprises wheels 1, axles 2, journal boxes 3, equalizers 4 extending between adjacent journal boxes at the same side of the truck, a truck frame 5 with dependent pedestals 6 for slidably receiving journal boxes 3 and supported upon the equalizers by springs 7, swing hangers 8 pivotally suspended from the truck frame to swing transversely of the truck. A spring plank 9 supported at its opposite ends from the lower ends of said swing hangers by cross bars 10 mounts bolster springs 11 which in turn carry the bolster 12 provided with a center plate 13. The vehicle body underframe includes center sills 14, side sills 15 and cross members 16. A body center plate 17, attached to the center sills 14, is assembled with the truck center plate 13, the center plates providing the support for the vehicle body and for the swiveling action of the truck and body.

Also in the arrangement shown in Figures 1 to 4, each of two diagonally opposite corners of the truck and the adjacent side of the car body are connected by a shock absorber device. A gusset 18 extends between the adjacent truck frame side member 19 and truck frame end member 20 and mounts a shock absorber 21, preferably of the rotary vane hydraulic type with a horizontally disposed arm 22 projecting diagonally of the truck frame and connected at its outer end to the adjacent vehicle body side sill 15 by a link 23. The joint 24 between arm 22 and link 23 includes a pivot with its axis disposed substantially vertically. The joint between the outer end of link 23 and the vehicle body side sill includes a terminal 25 threaded onto link 23 and secured in adjusted position thereon by nuts 26. The terminal includes a vertical sleeve 27 with a rubber bushing 28 surrounding a vertical pin 29 seated in a bracket 30 mounted on side sill 15.

The rubber bushing and elongated linkage accommodates a limited amount of movement of the truck frame vertically relative to the vehicle body.

When the truck swivels about center pin 30 from the full line position to the broken line position shown in Figure 1, the shock absorber end of arm 22 will move to the position indicated at 22a and link 23 will move to the position indicated at 23a. From the instant this movement begins and throughout this movement the change in the angular relation between the arm and link and therefore between the truck and the vehicle body will be yieldingly resisted by the movement of the shock absorber vane through the shock absorber fluid and the lateral movement of the interconnected parts as they return to the normal position shown in full lines will be similarly resisted. As the truck swings in the opposite direction, the shock absorber end of arm 22 will move to the position indicated diagrammatically at 22b and the other parts will shift accordingly. Shock absorbers could be located at each end on the same side or at each end on the longitudinal center line.

In the arrangement shown in Figures 5, 6, and 7, the truck and frame structures are substantially the same as that previously described but each shock absorber 31 is mounted upon a plate 32 at the bottom of center sill 33 and its arm 34 extends horizontally longitudinally of the vehicle and preferably, but not necessarily, along the longitudinal center line of the vehicle and truck.

The outer end of each arm 34 is connected by a link 35, extending horizontally and transversely of the vehicle, to a terminal 36 mounted on a bracket 37 on the adjacent corner of the truck frame 38. Terminal 36 and its connection to the truck frame bracket correspond to that shown in Figure 4.

While the details of this form of the invention differ substantially from the details of the form previously described and the shock absorbers and their linkages are at a lower level than those previously described, the general effect is the same.

Each arrangement disclosed effectively resists nosing of the truck and undue side sway of the bolster and truck frame relative to the body without affecting the action of the bolster springs or the truck springs and without preventing swiveling of the truck as is required for the vehicle to negotiate to travel the curved track.

Obviously the type or design of shock absorber device or the mountings or connections used between each device and the structure on which they are mounted or to which they are connected may be varied other than as shown while retaining the advantages set forth in the introductory portion of the specification and the shock absorber devices and structures on which they are mounted or to which they are connected may be modified as to other details without departing from the spirit of the invention as specified in the claim.

What is claimed is:

In a railway vehicle, a body including a center sill structure, a truck including spaced wheel and axle assemblies and a truck frame supported from said assemblies, the truck having a bolster intermediate said assemblies and mounted on said frame for movement laterally thereof, said center sill structure having a swivel connection to said truck bolster, a shock absorber mounted on said center sill structure adjacent to each end portion of the truck frame and provided with an operating arm extending substantially horizontally and longitudinally of the vehicle, and a link extending substantially horizontally and transversely of the vehicle and connecting the outer end of each shock absorber operating arm to an adjacent portion of the truck frame.

References Cited in the file of this patent

UNITED STATES PATENTS

| 2,153,389 | Perkins | Apr. 4, 1939 |
| 2,349,610 | Brunner | May 23, 1944 |
| 2,352,039 | Travilla | June 20, 1944 |
| 2,464,760 | Dean | Mar. 15, 1949 |

FOREIGN PATENTS

| 757,471 | France | Dec. 27, 1933 |
| 771,522 | France | Oct. 10, 1934 |